United States Patent
Beele (10) Patent No.: US 8,360,437 B2
(45) Date of Patent: Jan. 29, 2013

(54) SYSTEM AND METHOD FOR SEALING IN A CONDUIT A SPACE BETWEEN AN INNER WALL OF THE CONDUIT AND AT LEAST ONE PIPE OR CABLE EXTENDING THROUGH THE CONDUIT

(75) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 411 days.

(21) Appl. No.: 12/528,813

(22) PCT Filed: Oct. 2, 2007

(86) PCT No.: PCT/EP2007/060445
§ 371 (c)(1), (2), (4) Date: Mar. 18, 2010

(87) PCT Pub. No.: WO2008/104237
PCT Pub. Date: Sep. 4, 2008

(65) Prior Publication Data
US 2010/0164176 A1  Jul. 1, 2010

(30) Foreign Application Priority Data
Feb. 28, 2007  (GB) .................................. 0703886.2

(51) Int. Cl.
F16L 5/02 (2006.01)
F16L 21/05 (2006.01)
H02G 3/22 (2006.01)
(52) U.S. Cl. ........................................ 277/606; 277/603
(58) Field of Classification Search .......... 277/606–608, 277/603
See application file for complete search history.

(56) References Cited

U.S. PATENT DOCUMENTS

| | | | | |
|---|---|---|---|---|
| 4,086,736 A * | 5/1978 | Landrigan | .................... | 52/220.8 |
| 4,607,469 A * | 8/1986 | Harrison | ...................... | 52/220.8 |
| 5,344,106 A * | 9/1994 | Beele | ............................ | 248/56 |
| 5,458,343 A * | 10/1995 | Dornfeld et al. | ............... | 277/503 |
| 5,744,199 A * | 4/1998 | Joffre et al. | .................... | 427/387 |
| 6,239,378 B1 * | 5/2001 | Shephard | ................... | 174/110 S |
| 6,674,012 B2 * | 1/2004 | Beele | ......................... | 174/140 R |
| 6,777,616 B2 * | 8/2004 | Beele | ........................... | 174/650 |
| 6,862,852 B1 * | 3/2005 | Beele | ........................... | 52/220.8 |
| 6,878,410 B2 * | 4/2005 | Ahmed et al. | ................ | 427/387 |
| 7,071,411 B2 * | 7/2006 | Beele | ........................... | 174/659 |
| 2006/0155039 A1 | 7/2006 | Alexander et al. | | |

FOREIGN PATENT DOCUMENTS

DE  3542318 A1  6/1987
EP  0534563 A1  3/1993
(Continued)

OTHER PUBLICATIONS

International Preliminary report, International Application No. PCT/EP2007/060445 dated Jun. 22, 2009.

*Primary Examiner* — Vishal Patel
*Assistant Examiner* — Nicholas L Foster
(74) *Attorney, Agent, or Firm* — Wolf, Greenfield & Sacks, P.C.

(57) ABSTRACT

System for sealing in a conduit a space between an inner wall of the conduit and at least one pipe or cable extending through the conduit, wherein the system comprises: at least one rubber element for providing in the conduit a support-structure which is clampable between the inner wall and the at least one pipe or cable; and a sealant for application against the support-structure and for sealing off at least one end of the conduit between the inner wall and the at least one pipe or cable.

35 Claims, 6 Drawing Sheets

FOREIGN PATENT DOCUMENTS

| | | |
|---|---|---|
| EP | 1703189 | 9/2006 |
| JP | 05-287086 A | 11/1993 |
| JP | 2006503121 A | 1/2006 |
| NL | 1019909 C1 | 8/2003 |
| WO | WO 03/013658 A1 | 2/2003 |
| WO | WO 2005/078884 A2 | 8/2005 |
| WO | WO 2006/097290 A | 9/2006 |

* cited by examiner

SYSTEM AND METHOD FOR SEALING IN A CONDUIT A SPACE BETWEEN AN INNER WALL OF THE CONDUIT AND AT LEAST ONE PIPE OR CABLE EXTENDING THROUGH THE CONDUIT

INTRODUCTION

The invention is related to a system and a method for sealing in a conduit a spade between an inner wall of the conduit and at least one pipe or cable extending through the conduit.

THE BACKGROUND OF THE INVENTION

A sealing system is usually applied in a conduit which is itself incorporated in a construction element that divides, for instance, two compartments. A pipe or cable may extend through the conduit from one of the two compartments into the other. Such a conduit is often present on board of vessels and/or other offshore applications such as oil rigs. These conduits are often referred to as pipe or cable penetrations or transit systems. These penetrations are seen as unwelcome necessities in such a construction. Pipes for, for instance, water distribution and water wastage systems, air conditioning systems, hydraulic and pneumatic control, sprinkler etc. but also for transport of gas, or oil, need to be extending throughout such a construction, even though this entails introducing "weak spots" in a separation of the compartments. Cables could be electricity cables.

Such weak spots do not manifest themselves to a great extent in the mechanical strength of the construction but much more in the undesired transport of physical phenomena throughout the structure. One of these physical phenomena is the occasion of a fire which needs to be confined to only one area as long as possible, not only to allow for control and extinguishing the fire, but also to provide time for people present in compartments near to the fire for reaching a safe distance from the fire before it further extends. To prevent smoke and/or fire from passing through the conduit from one compartment to another, the conduit is usually provided with material that closes the conduit, at least for some time, when the conduit is exposed to heat due to a fire.

Although above reference is made to a construction element having a conduit and dividing two compartments, it is also possible that the construction element separates a compartment from the surrounding environment. It is thus possible that one side of the construction element is exposed to atmospheric conditions.

It will be appreciated that a pipe extending through a conduit, the conduit itself and the construction element into which the conduit is incorporated, are each usually made of a heat conducting material, for instance aluminium or steel. It is often the case that in these circumstances, heat still only enters the conduit sleeve via the pipe or pipes which extend from the side exposed to fire into the conduit. This is because entrance of heat through material of which the conduit is made, is often inhibited by a thermally insulating lining provided against the outer wall of the conduit and the construction element in which the conduit is incorporated.

However, nowadays, thermally insulating lining is not always applied around the conduit and consequently heat can be conducted through the conduit material from an outside to an inside side of the conduit. It follows that heat can be supplied via at least two routes to the inner space of the conduit. The first route is the supply via the pipes extending into the conduit and a second route is the supply of heat to the inner space of the conduit by the thermally conductive material out of which the conduit is made. As heat may be supplied via two routes, heat may be supplied very rapidly to the inner space of the conduit sleeve. These conditions are frequently found in offshore constructions and vessels, where construction materials are indeed made of metal, i.e. a heat conducting material. In constructions other than offshore constructions and vessels, like for instance onshore constructions, entrance of heat via the second route takes place much less often, if occurring at all.

WO 2006/097290 describes a system which is to a certain extent suitable for placement in a conduit as described as above. That system comprises heat expandable rubber sleeves. The rubber is made heat expandable by incorporation of heat-expandable graphite into that rubber. The system further comprises a fire resistant and/or watertight sealant for sealing off both ends of the conduit. When exposed to a nearby fire, the heat transferred into the conduit causes the expandable sleeves to expand and as such to seal off the conduit by forming a soft, almost powder-like mass without offering mechanical stability to the sealing. The expansion may cause the sealant layer to break. This breaking is in itself not a problem as the expanded sleeves have sealed off the conduit before the sealant layer breaks. Sometimes, also the sealant is made heat-expandable.

To allow for rapid and uninhibited thermal expansion, the components of the rubber sleeves are kept together within the dimensions of the sleeve but are certainly not captured in a rigid internal structure. Consequently, the sleeves are rather soft. As one never knows how much heat input is provided to the sealing system, and to ensure that it responds timely and sufficiently the system is such that even when only a relatively small increase in temperature is experienced a portion of the system expands, and closure of the conduit takes place. In other words, due to the uncertainty in the amount of heat reaching the sealing system, the system is made very sensitive. An "excess" of heat results consequently in an overresponding expansion, even outwards the conduit.

Although such systems are satisfactorily used and pass many fire safety tests, an alternative and perhaps an even further improved system, remains desirable, as safety on board of offshore constructions and/or vessels is in practice always a compromise between costs and time during which a penetration has to withstand a fire at one side of the penetration.

It is an object of the invention to provide an alternative, and for certain circumstances more suitable system.

SUMMARY OF THE INVENTION

Provided is a system for sealing a conduit space between an inner wall of the conduit and at least one pipe or cable extending through the conduit. The system comprises at least one rubber element for providing in the conduit a support-structure which is clampable between the inner wall and the at least one pipe or cable; and a sealant for application against the support-structure and for sealing off at least one end of the conduit between the inner wall and the at least one pipe or cable. Each rubber element is made of a fire resistant vulcanized rubber of a thermally substantially non-expandable type. The sealant is made of a fire resistant polymer which is vulcanizable at room temperature under exposure to humidity and which is also of the thermally substantially non-expandable type.

One or more rubber elements of vulcanized rubber have, when clamped in the conduit, a high mechanical stability. Due to this, the sealant forms, when applied against the structure, not only a barrier against smells and smoke, but also against water.

It has turned out, that before exposure to a nearby fire, the sealant, as supported by the support-structure, can easily withstand a pressure of 7 bar without causing bulging of the sealant into the conduit at the exposed side. It has further turned out that the sealing is thermally insulating. It further became clear that in use and under exposure to a nearby fire, such a system experiences such little thermal expansion that the support-structure as provided by the one or more rubber elements clamped in the conduit, the rubber seal as provided by the sealant, remains in place and continues to provide a suitable sealing. After exposure to a nearby fire, a great deal of the sealing remains unconsumed, and to a certain extent still acts as a sealing.

A major advantage of the system according to the present invention is that the sufficiency of the sealing can easily be assessed "on the spot" by any worker installing the system. Designing prior to installing, in an office using a computer on the basis of thermal management considerations and/or thermal expansion considerations, i.e. factors which determine the performance of a sealing system under a modelled fire, is not necessary. Once the stability of the sealing system according to the invention has been established prior to exposure to a nearby fire, i.e. during installation of the sealing, the stability during exposure to a nearby fire changes little. In other words, the mechanical stability and thermal insulation is largely maintained during exposure to a nearby fire. The sealing system remains in place and remains functioning as a sealing system. No parts of the sealing system fall out of the conduit.

As further elaborated upon in the description of examples, the system according to the invention is also applicable in situations wherein no thermal insulation is applied to the conduit or to the construction element in which the conduit is incorporated. It turns out that the sealing system can withstand very high temperatures.

Rubber or polymer of the thermally substantially non-expandable type comprises rubber respectively polymer which is free from components which would on heating cause the rubber respectively the polymer to expand to an extent larger than the extent to which the rubber respectively the polymer itself expands on such heating.

In an embodiment, the rubber element is a longitudinal element. A longitudinal rubber element is very easily placed in the conduit and allows for an easy way of building up the support structure. After all, the longitudinal element can be placed parallel to the pipe extending through the conduit. By stacking such longitudinal elements all oriented along the pipe, a support structure is conveniently obtained in the conduit. By adding more and more of these elements into the conduit, which is not too difficult given the structure already formed and the shape of the additional elements, the structure will be clamped in the conduit.

In an embodiment, the longitudinal rubber element is a tubular element, or a number of the longitudinal elements can together form at least one tubular element. The tubularity of such elements offers the advantage that the sealing system will be lighter, and that the elements can be deformed in a transverse direction. It allows for a firm clamping of the elements in the conduit, further enhancing the stability of the support structure, leading to further stability of the sealant layer. The parts of the rubber elements which are clamped against each other inhibit relative movement of these parts due to high normal and high frictional forces at the places of contact. This also applies to contact between rubber elements and the pipe or cable, or inner wall of the conduit. This all contributes to the "fixing" of the support structure in the conduit. The support structure can also provide support to the pipes or cables extending through the conduit. Another advantage of the tubular elements is that air will be entrapped in the tubular elements, providing in use optimal thermal insulation of the sealing system.

In an embodiment, the rubber has a hardness in a range of 70 to 78 Shore A, preferably about 74 Shore A. It has turned out that such a hardness provides rubber elements with very good mechanical properties, but still allowing for deformation of the rubber elements, and as such contributing to the formation of a stable support structure in the conduit.

In an embodiment, the mantle wall is closed in itself, i.e. non-split, preferably with a thickness of 2-5 mm, or even more, preferably 3-4 mm. This ensures stability of the shape of the rubber element.

In an embodiment, each element of the at least one rubber element and/or the sealant has a colour which contrasts to black. As will further be described during a description of preferred embodiments, the rubber elements are not consumed when exposed to a nearby fire. Although normally everything is blackened when exposed to a nearby fire, the rubber elements and the sealant, in particular at the unexposed side of the conduit, will not change colour during exposure of the conduit to a nearby fire, and as such quickly indicate the state of the sealing during and after a fire. This enables rapid understanding of the phenomena which took place during the fire. This will enhance further improving fire safety regulations aboard vessels and other offshore constructions.

Further advantageous features of the system according to the invention will be described on the basis of exemplary embodiments with reference to the drawing which shows in.

In the drawing, like parts are provided with like references.

DESCRIPTION OF EXEMPLARY EMBODIMENTS

Figure 1:
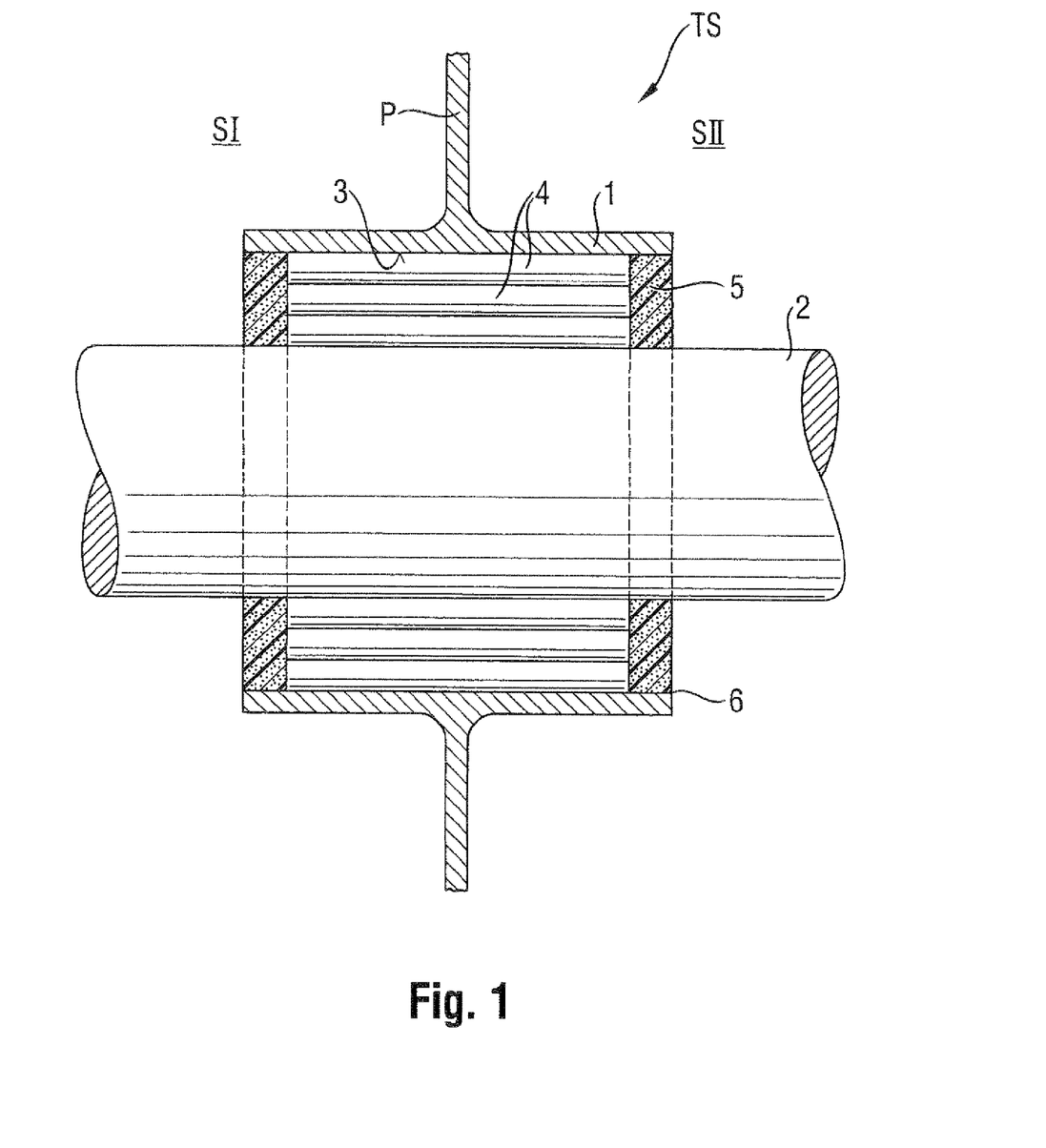
FIG. 1 schematically, in cross section, an embodiment of a system according to the invention.

FIG. 1 shows schematically an example of a cross section of a transit system TS in which, as shown, a system according to the invention can be applied. The transit system TS is usually incorporated in a metal substantially plate-shaped construction element P. This plate-shaped construction element P can be situated between two spaces SI, SII, as separated by the construction element P. The plate-shaped construction element may for instance be a part of a bulkhead, a wall or a deck in or on a ship or another construction that is substantially constructed of a metal such as for instance steel. The transition system TS comprises a conduit 1, made of a material which is in this example thermally conductive. The conduit 1 may be welded into an opening of the construction element P. Although as shown in this example, the conduit 1 is incorporated in a metal substantially plate-shaped construction element P, it is also possible that the conduit 1 is incorporated in for instance a concrete wall or a separation made of any other material.

Through the conduit 1 extends a pipe 2. As will be discussed later, it is also possible that instead of a pipe 2, one or more cables extend through the opening. The pipe 2 may be made of steel, copper, a copper nickel alloy, or for instance a so-called glass fiber reinforced plastic (GRP) pipe. The system as installed in the conduit 1 in a space (usually an annular space) between an inner wall 3 of the conduit 1 and the pipe 2 comprises at least one rubber element 4 for providing in the conduit 1 a support structure. The one or more rubber elements 4 are clampable between the inner wall 3 and the pipe 2. In practice, the support structure is thus clamped in the conduit 1. Each of the rubber elements 4 is clamped in, all are part of the support structure. The system further comprises a sealant 5 for application against the support structure and for sealing off at least one end 6 of the conduit 1 between the inner wall 3 and the pipe 2. As shown, preferably both ends 6 are sealed off by the sealant 5.

Each rubber element 4 is made of a fire-resistant vulcanized rubber of a thermally substantially non-expandable type. The rubber is preferably a silicon based rubber. This rubber can be made by standard processes known to those skilled in the art on the basis of components which are widely commercially available. The sealant 5 is made of a fire-resistant polymer which is vulcanizable at room temperature under exposure to humidity and which is also of the thermally substantially non-expandable type. The polymer is preferably a silicon based polymer. Also such a sealant can be made by a standard process known to those skilled in the art and on the basis of components which are widely commercially available. A rubber of the thermally substantially non-expandable type comprises a rubber which is free from components which would on heating cause the rubber to expand to an extent larger than the extent to which rubber itself expands on such heating. Likewise, a polymer of the thermally substantially non-expandable type comprises a polymer which is free from components which would on heating cause the polymer to expand to an extent larger than the extent to which a polymer itself expands on such heating.

Preferably, each rubber element 4 is a longitudinal element. This allows for easily placing such an element into conduit 1 and parallel to pipe 2. When the sealing system comprises one rubber element this could be a substantially annular element provided with a longitudinal slit to allow for the placement coaxial with pipe 2. However, it is also possible that the rubber element is an element which can be wound around pipe 2 and forced into the longitudinal direction of pipe 2 and conduit 1 into the space between the inner wall 3 and the pipe 2. Longitudinal rubber elements 4 aligned as shown in FIG. 1 provide a support structure against which sealant 5 can be applied. When pressure is applied in longitudinal direction of conduit 1 and pipe 2, the support structure as provided by the one or more rubber elements 4 offers good support to sealant 5.

Figure 2:
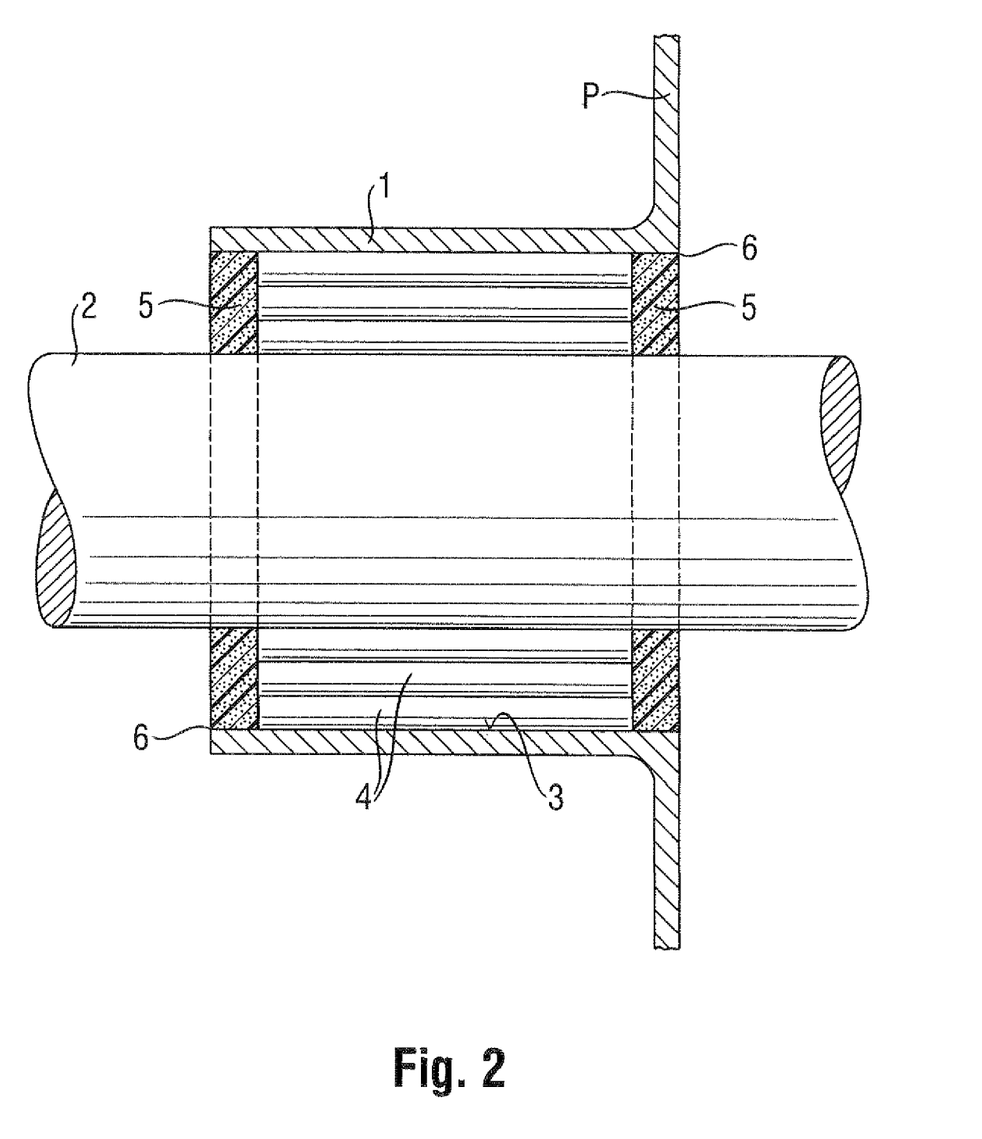
FIG. 2 schematically, in cross section, an embodiment of a system according to the invention.

FIG. 2 shows that a system according to the invention can also be applied in a conduit 1 which is asymmetrically positioned with respect to construction element P.

Figure 3:
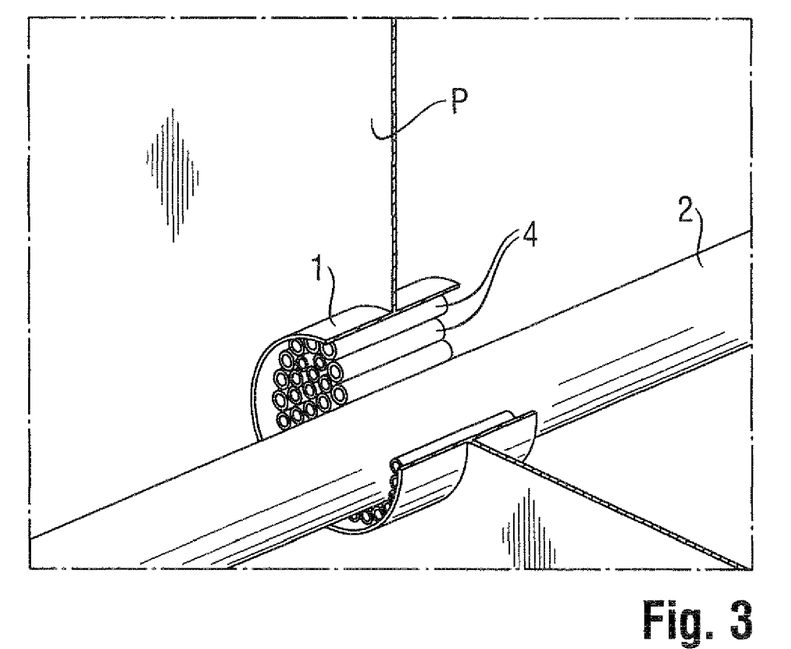
FIG. 3 in a perspective and semi-exploded view part of an embodiment of a system according to the invention during installing the system.
Figure 4:
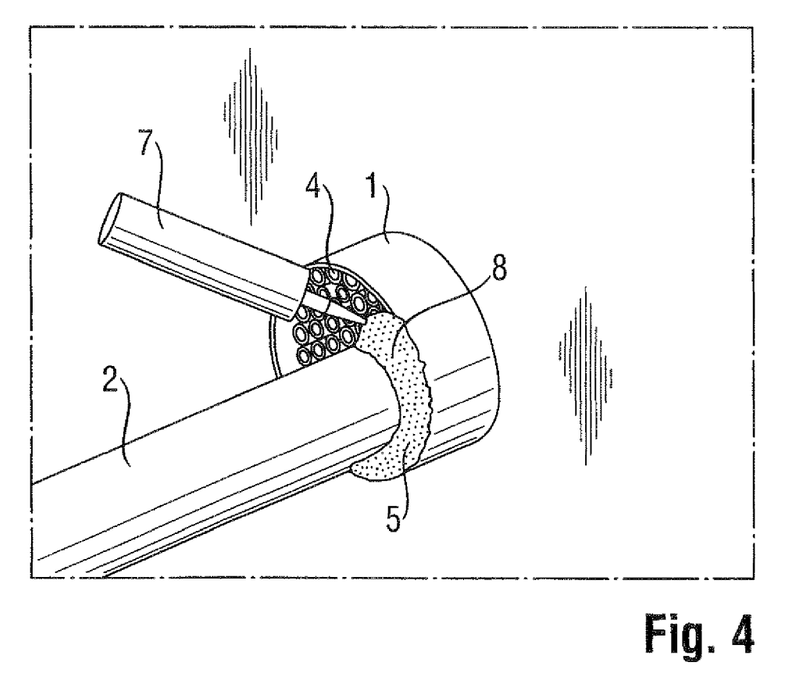
FIG. 4 in a perspective view, an embodiment of a system according to the invention during installing the system.
Figure 5:
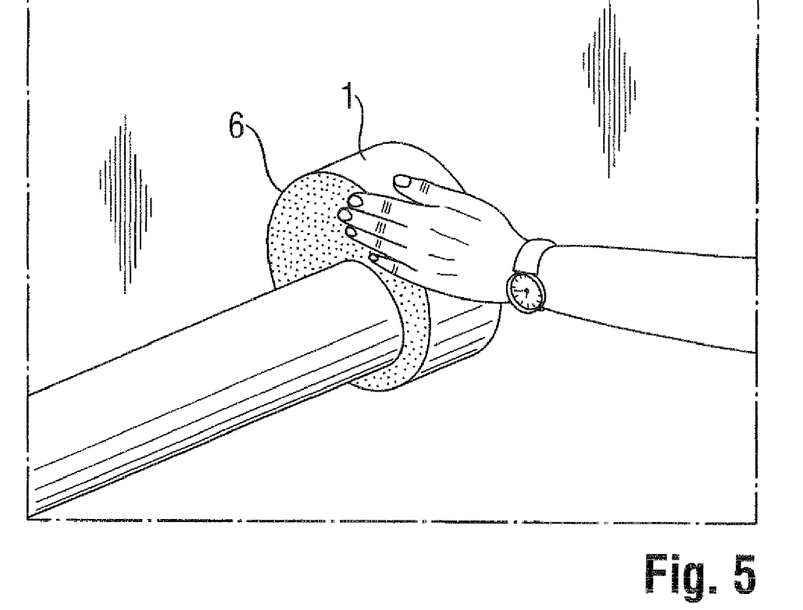
FIG. 5 in a perspective view, an embodiment of a system according to the invention in a final stage of installing the system.

FIG. 3-5 show how a system according to the invention can be installed in a conduit 1 through which a pipe 2 extends. In these figures is shown that the rubber elements 4 may be longitudinal rubber elements having a tubular shape. Each of the rubber elements 4 comprises preferably a mantle wall. When the mantle wall is closed in itself, i.e. non-split, the strength of the tubular rubber element is stronger compared to a situation wherein the mantle wall is provided with a longitudinal slit. The thickness of the mantle wall is preferably in a range of 2-5 mm, even better is 3-4 mm. Although it is possible to provide the tubular elements 4 for instance such that the cross section is a squared, triangular or differently angularly shaped, it is also possible to have a cross section which is more rounded, such as an elliptical or a circular cross section. Preferably, each of the rubber elements is cylindrical in shape. This shape helps the tubular element 4 to be equally strong in each transverse direction. Once the conduit 1 is filled with such longitudinal cylindrically shaped tubular rubber elements, the support structure as formed with those elements 4, can be clamped by itself in the space between the inner wall 3 of the conduit 1 and the pipe 2. This enhances the strength and stiffness of the support structure. As such the support structure can also support the pipe 2 as extending through conduit 1. Due to the very nature of the material used for building this support structure, a mechanical shock can easily be absorbed by this support structure. Vibrations, particularly in transverse direction are most likely to be fully dampened out by the support structure. At the same time, the strength offered by the support structure in a longitudinal direction is extremely high. Also sound can be dampened out, and thus absorbed by the sealing system according to the invention.

The strength further increases with the tightness by which the rubber elements 4 are clamped within the space between inner wall 3 and pipe 2. Relative movement of the rubber elements 4 in their axial directions is inhibited by relatively high frictional forces occurring at their contact surfaces. The rubber elements also have a low compression set, a property related to the maximum deformation which the rubber can experience and from which it can still fully relax back to its original dimensions. The compression set is relatively low, about 40%, so that the clamping offered can be maintained during service life of the sealing system. Beside the good mechanical properties of the support structure it must also be appreciated that such a structure comprises a number of channels which are fully isolated from each other, and particularly when the sealant 5 is applied at both ends 6 of the conduit 1, closed off at both ends, such that the support structure also becomes a very good thermal insulator. The air cavities formed by the unconnected channels also add to the high thermal insulation of the support structure itself.

It has turned out that an optimal support structure can be formed when a number of the cylindrically shaped rubber elements have an outer diameter in a range of 16-30 mm. Depending on this outer diameter, the inner diameter is preferably in a range of 10-22 mm. The fire-retardant vulcanized silicon rubber has preferably a hardness in the range of 70-78 Shore A. A very suitable hardness is 74 Shore A. For easy production, ordering, stocking and installing of these rubber elements, the elements have preferably all the same shape. However, it is possible that the elements comprise two types of rubber element. All elements may have similar dimensions in the longitudinal direction, but a member of one of the two types and a member of the other one of the two types may differ in transverse dimension. This allows for filling the conduit with the rubber elements 4 in an optimal way, not only with regard to easy installing but also with regard to obtaining a support structure with optimal properties.

It is pointed out that a support structure having the structural properties as follows from the use of tubular rubber elements, may also be achieved by using longitudinal elements having a shape as shown in for instance FIG. 2 of WO 03/067136.

As shown in FIG. 4, once the space between the inner wall 3 and the pipe 2 is completely filled with rubber elements 4, the sealant 5 made of fire-resistant polymer, preferably a silicon based polymer, and vulcanizable at room temperature under exposure to humidity, is applied at the end 6 of conduit 1 between the inner 3 and pipe 2 and against the support structure as formed by rubber elements 4.

The sealant can be made such that an outer layer 8 of the sealant is cured under exposure to atmospheric humidity within a period of time of about 1 to 2 hours. When applied for sealing off an end 6 of the conduit 1 and as vulcanized under exposure to atmospheric humidity within 1 to 2 hours, the sealant has a hardness of about 40-45 Shore A.

Figure 6:
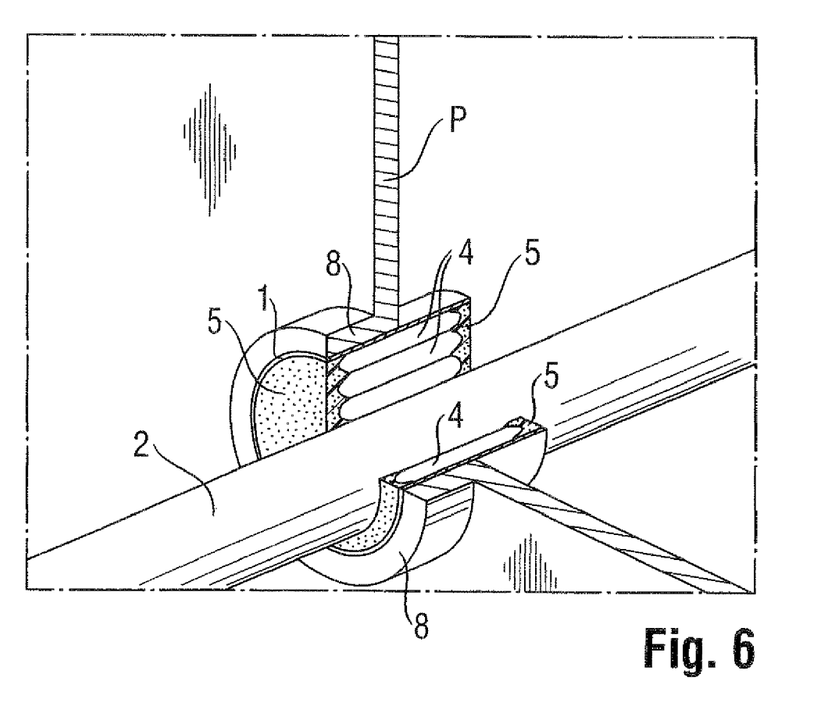
FIG. 6 in a perspective and partly exploded view, an embodiment of a system according to the invention as installed.

As shown in FIG. 5, before the sealant 5 has fully been cured, i.e. vulcanized, it is possible to press manually the sealant 5 further into conduit 1, so that sealing material will end up within the tubular elements 4 as well as between the tubular elements 4. Of course sealant 5 may already have ended up in cavities of the support structure when applied against the structure, in particular when use was made of a so-called high pressure applicator to applying the sealant 5. This is to a certain extent shown in FIG. 6. This pressing of the sealant 5 into the conduit 1 may continue until the sealant 5 is flush with an outer end 6 of conduit 1. After curing of the sealant 5, support structure and sealant 5 can mechanically be a single structure. Adhesion of the sealant 5, both to the rubber elements 4 forming the support structure and to the to inner wall 3 of the conduit 1, is very good.

The performance of the sealing system when on one side of the conduit 1 a nearby fire is exposing that side of the conduit to an enormous amount of heat, is also very good. For a start, within the first hour after exposure to the nearby fire, no smoke passes the sealing from a side where the fire takes place. The same applies far smells. In fact, within the first hour after exposure of one side of the conduit to a nearby fire, it is only the red-hot colour of the metal conduit 1 and the steel construction element P which reveals that a fire is taking place at the other side of the conduit.

At the side unexposed to the fire, after one hour the sealing system has in the middle between the inner wall 3 of the conduit 1 and the pipe 2 (both of steel) only risen by about 160° C. As the silicon rubber and the sealant is non-ignitable at a temperature of 400° C. or lower, this part of the sealing system remains fully intact. The mechanical stability of the sealing is also largely unaffected by the fire as taking place at the other end of the conduit. Each rubber element 4 and the sealant 5 has preferable an oxygen index of 45% or higher. It turns out that during such conditions as described, such an embodiment of a sealing system in accordance with the invention, is not consumed during exposure to a nearby fire at either side of the conduit 1. It has turned out that without any insulation applied to the conduit and/or the construction element P (so that heat can enter the conduit 1 via the construction element P and pipe 2), the sealing system can easily sustain more than one hour exposure to the fire at one end of the conduit without having any smoke or smells passing through the conduit 1 and without having any flame breaking through the conduit 1 to the unexposed side. The time during which such an excellent insulation as provided by the sealing system can be maintained, can be lengthened when insulation material is applied against the conduit and/or the construction element P. Such material is shown by reference 8 in FIG. 6 and is usually a form of mineral wool. However, this system has primarily been invented for use in non-insulated construction elements P. If it is certain that insulation will be applied, then the conduit 1 can be shorter in longitudinal direction.

The sealing system is preferably such that rubber elements 4 and/or the sealant 5 have a colour which contrasts with black. This allows after exposure of one side of the conduit 1 to a nearby fire, quickly identification of the sealing system. This allows for assessing the severity of the fire, and for assessing the time during which the sealing system was exposed to enormously high temperatures. In other words, it allows for understanding what took place during the fire in terms of thermal exposure. The colour contrasting with black is preferably red-brown, something like terracotta. This colour is very easily traced back even in a fully blackened and burned out compartment.

Figure 7:
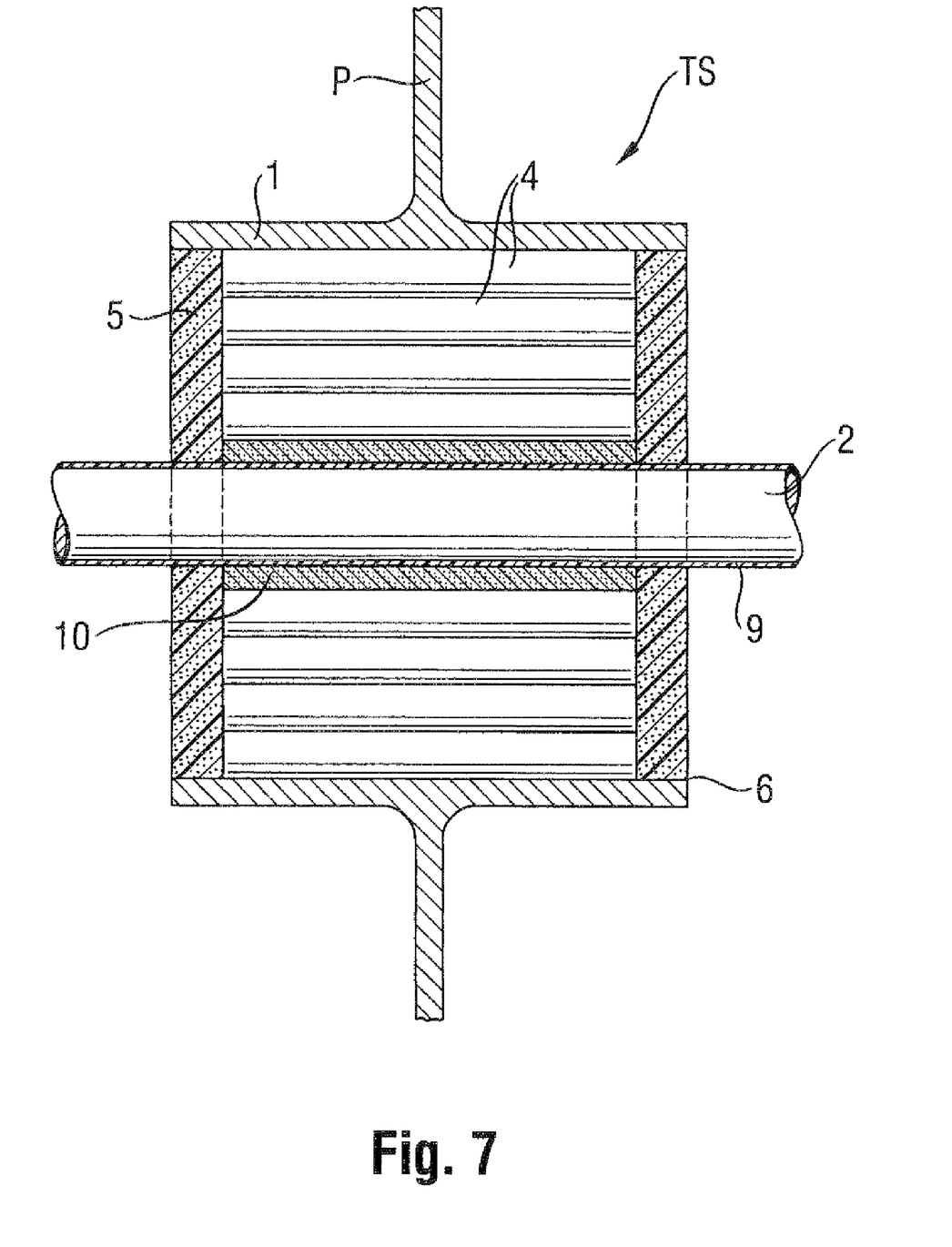
FIG. 7 schematically, in cross section, an embodiment of a system according to the invention.

FIG. 7 shows an alternative embodiment of a sealing system in accordance with the invention. In this case, the system further comprises an element 10 of a thermally substantially expandable type. This element 10 is in use, as shown, placeable coaxially around the pipe 2. This is particularly suitable for a situation wherein pipe 2 is a copper pipe provided with an insulation layer 9, for instance an insulation foam such as Armaflex. Such copper pipes are usually chilled "water lines". On the one hand it is not desirable to remove the insulation layer along a part which extends through the conduit 1 as a relatively cold pipe part in the conduit 1 will give rise to condensation, which in turn may initiate corrosion of the conduit 1. On the other hand, the insulation layer 9 forms in the conduit 1 a weakness as it will react when heat is transferred from a nearby fire via the copper. In practice, the insulation foam will then burn away. The sealing system according to an embodiment as shown in FIG. 7 is for such an application further provided with the element 10 which is of a thermally substantially expandable type, in this case a sleeve 10, or a sleeve-like arrangement 10 comprising a heat expandable rubber, for instance an EVA or an EPDM rubber provided with heat expandable graphite. When a nearby fire takes place and the copper pipe transfers heat into the conduit, the insulation foam 9 will still burn away, but the heat expandable rubber sleeve will expand radially. Due to the clamping forces of the support structure, the expansion is directed radially inwards. Due to the thermal insulation of the support structure, as provided by the rubber elements 4, remains the heat transferred via the pipe 2 into the conduit located close to the pipe 2. The thermal expansion of element 10 is also for this reason directed radially inwards, i.e. in the direction of the higher temperatures.

A skilled person will, on the basis of routine experiments and guidance by the manufacturer of the materials involved, be able to find the right balance between dimensions of the element 10 of the thermally substantially expandable type, the diameter of the pipe 2 and the size of the conduit 1.

The element 10 of the heat expandable type will in general be relatively thin compared to the diameter of the pipe 2. The support structure, as provided by clamped-in rubber elements 4, will still be able to apply radial pressure onto the pipe 2.

It will be clear to those skilled in the art that element 10 can also be a multiple-part element 10, which can coaxially surround a pipe by suitable positioning of each of the parts of that element 10.

It will further be clear that the element 10 of the thermally substantially expandable type comprises material having components which would on heating cause the material to expand to an extent larger than the extent to which the material itself expands on such heating. Such a component is for instance, as mentioned, heat expandable graphite.

It is further pointed out that a system according to the invention as shown in FIG. 7 may equally be useful for a conduit 1 through which an electricity cable extends. After all, such a cable has usually a capper core and a plastic sheathing around it, in a way similar to the chilled water lines provided with insulation.

Figure 8:
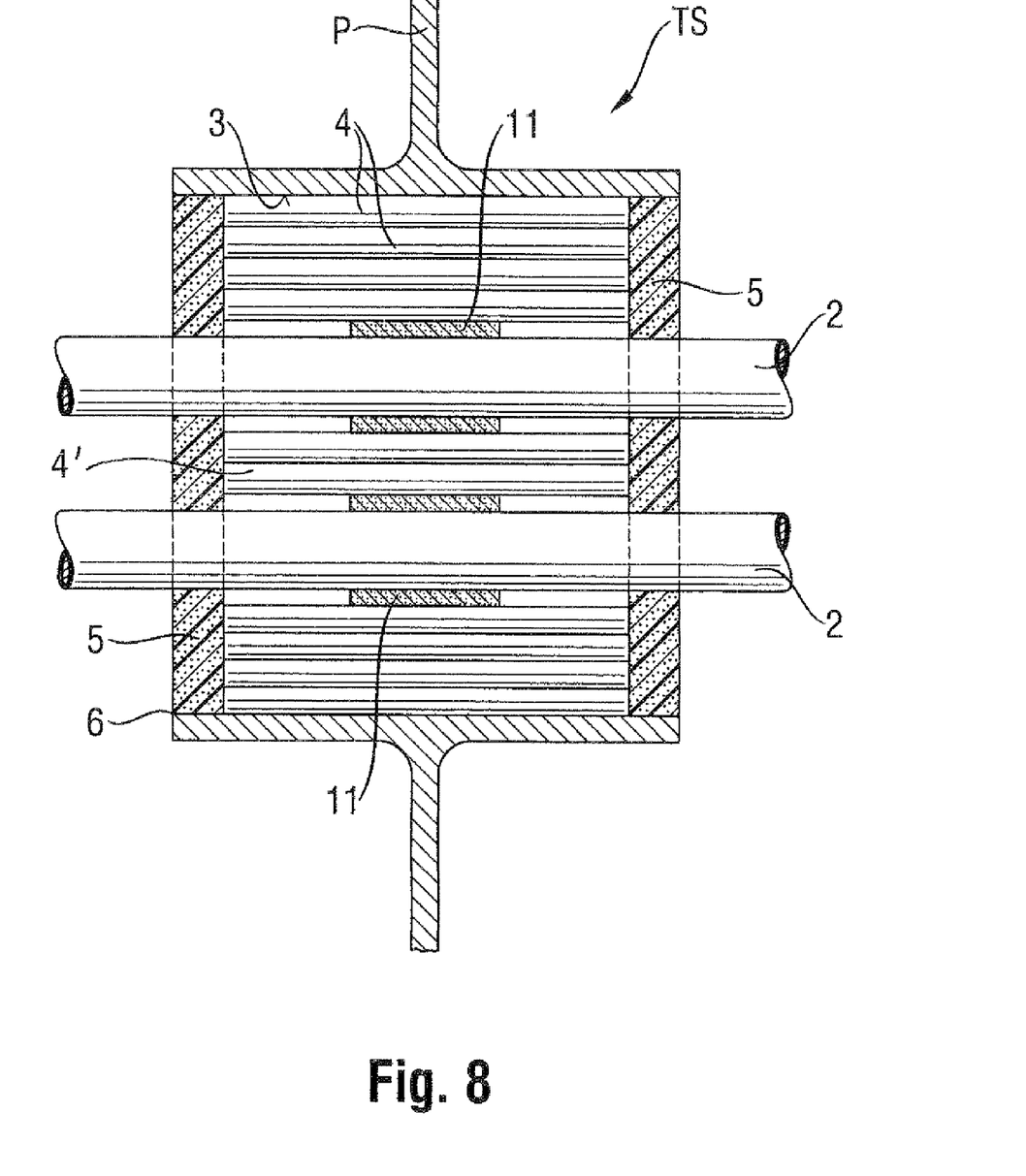
FIG. 8 schematically, in cross section, an embodiment of a system according to the invention.

FIG. 8 shows a conduit 1 with another embodiment of a sealing system according to the invention. The sealing system is suitable for "multiple penetrations", i.e. for a conduit 1 through which more than one pipe (or cable) extends. It is of course possible that many more pipes 2 or cables extend through the conduit 1. Furthermore, the elements 11 of the thermally substantially expandable type are short relative to the length of the conduit 1, and short relative to the length of the longitudinal elements 4 placed in the conduit radially further away from a pipe (or cable) 2. In longitudinal directions the elements 11 are also placed between vulcanized rubber elements 4', which are shorter than vulcanized rubber elements 4 radially further away from the pipe (or cable). As also the shorter vulcanized rubber elements 4' are in use clamped in, also these elements 4' contribute to the radially inward expansion of the heat expandable elements 11. A system as shown in FIG. 8 is suitable for a conduit through which a plastic pipe 2 extends. When the plastic weakens due to exposure to heat, the heat expandable elements 11 expand also due to exposure to heat and crush the pipe 2 and close the pipe 2 off. For such a use of this embodiment it also applies that a skilled person will by routine experiments and on the basis of specifications of the materials involved, be able to find the right balance of the respective dimensions of all elements involved. In general the thickness of the heat expandable element 11 relative to the diameter of the plastic pipe 2 will have to be relatively high.

It is further pointed out that embodiments of a sealing system according to the invention are not only suitable for conduits through which a plurality of cables or a plurality of pipes extend, but also for conduits through which a mixture of pipes and cables extend and for conduits through which pipes of different materials, such as plastic and metal, extend.

The invention is not limited to any of the embodiments described above on the basis of the figures and the drawings. Many modifications are possible.

In particular rubber elements 4 may have a different shape than shown and discussed. It is for instance possible to provide a sheet-like material which can be wrapped around the pipe. The sheet may be provided with spacers to still end up with cavities in the support structure as formed in the conduit. It is possible to provide blocks of a predetermined structure such as would be obtained by clamping a number of tubular elements together, and to cut out of such blocks suitably sized segments for insertions in the conduit. Such variations are all understood to fall within the framework of the invention as defined by the appended claims.

The invention claimed is:

1. A system for sealing in a conduit a space between an inner wall of the conduit and at least one pipe or cable extending through the conduit, wherein the system comprises:
    a plurality of rubber elements for surrounding the at least one pipe or cable such that each is placeable about the at least one pipe or cable in a non-coaxial fashion, the plurality of rubber elements for providing in the conduit a support-structure which is clampable between the inner wall and the at least one pipe or cable; and a sealant for application against the support-structure and for sealing off at least one end of the conduit between the inner wall and the at least one pipe or cable, the support-structure being capable of supporting at least the sealant, wherein each rubber element is made of a fire-resistant vulcanized rubber of a thermally substantially non-expandable type, and wherein the sealant is made of a fire-resistant polymer which is vulcanizable at room temperature under exposure to humidity and which is also of the thermally substantially non-expandable type, wherein the rubber or the polymer of the thermally substantially non-expandable type comprises rubber or polymer, respectively, which is free from components which would on heating cause the rubber or the polymer to expand to an extent larger than the extent to which the rubber or the polymer itself expands on such heating, wherein each rubber element is a longitudinal tubular element having a mantle wall, and with at least some of the rubber elements having a non-split mantle wall.

2. The system according to claim 1, wherein the rubber comprises a silicon based rubber.

3. The system according to claim 1, wherein the polymer comprises a silicon based polymer.

4. The system according to claim 1, wherein the rubber has a hardness in a range of 70 to 78 Shore A.

5. The system according to claim 1, wherein the mantle wall has a thickness in a range of about 2 to 5 mm.

6. The system according to claim 1, wherein the plurality of rubber elements comprises rubber elements which all have the same shape.

7. The system according to claim 1, wherein the plurality of rubber elements comprises two types of rubber elements.

8. The system according to claim 7, wherein a member of one of the two types and a member of the other one of the two types differ in transverse dimensions.

9. The system according to claim 1, wherein all of the plurality of rubber elements have similar dimensions in longitudinal direction.

10. The system according to claim 1, wherein at least one of the plurality of rubber elements is cylindrical in shape.

11. The system according to claim 10, wherein the cylindrically shaped rubber element has an outer diameter in a range of 16 mm to 30 mm.

12. The system according to claim 10, wherein the cylindrically shaped rubber element has an inner diameter in a range of 10 mm to 22 mm.

13. The system according to claim 1, wherein the sealant has a hardness in a range of 35-50 Shore A.

14. The system according to claim 1, wherein at least one of:
    1) each of the plurality of rubber elements
    and
    2) the sealant is non-ignitable at a temperature of 400° C.

15. The system according to claim 1, wherein at least one of:
    1) each of the plurality of rubber elements
    and
    2) the sealant has an oxygen index of at least 45%.

16. The system according to claim 1, wherein at least one of:
    1) each of the plurality of rubber elements
    and
    2) the sealant has a color which contrasts with black.

17. The system according to claim 16, wherein the color is red-brown.

18. The system according to claim 1, further comprising for at least one of the at least one pipe or cable, an element of a thermally substantially expandable type being placeable coaxially around one of the at least one pipe or cable.

19. The system according to claim 18, wherein the element of the thermally substantially expandable type comprises material having a component which would on heating cause the material to expand to an extent larger than the extent to which the material itself expands on such heating.

20. The system according to claim 19, wherein the material is EVA or EPDM rubber.

21. The system according to claim 19, wherein the component is heat expandable graphite.

22. The system according to claim 1, in combination with the conduit.

23. A method for sealing in a conduit a space between an inner wall of the conduit and at least one pipe or cable extending through the conduit, wherein the method comprises:
providing a plurality of rubber elements for surrounding the at least one pipe or cable such that each is placeable about the at least one pipe or cable in a non-coaxial fashion, the plurality of rubber elements for providing in the conduit a support-structure which is clampable between the inner wall and the at least one pipe or cable; and a sealant for application against the support-structure and for sealing off at least one end of the conduit between the inner wall and the at least one pipe or cable, the support-structure being capable of supporting at least the sealant, wherein each rubber element is made of a fire-resistant vulcanized rubber of a thermally substantially non-expandable type, and wherein the sealant is made of a fire-resistant polymer which is vulcanizable at room temperature under exposure to humidity and which is also of the thermally substantially non-expandable type, wherein the rubber or the polymer of the thermally substantially non-expandable type comprises rubber or polymer, respectively, which is free from components which would on heating cause the rubber or the polymer to expand to an extent larger than the extent to which the rubber or the polymer itself expands on such heating, wherein each rubber element is a longitudinal tubular element having a mantle wall, and with at least some of the rubber elements having a non-split mantle wall;
placing in the conduit the plurality of rubber elements; and sealing at least one end of the conduit with the sealant.

24. The method for sealing according to claim 23, further comprising placing coaxially around at least one of the at least one pipe or cable an element of a thermally substantially expandable type.

25. A system for sealing in a conduit a space between an inner wall of the conduit and at least one pipe or cable extending through the conduit, wherein the system comprises:
a plurality of rubber elements for surrounding the at least one pipe or cable such that each is placeable about the at least one pipe or cable in a non-coaxial fashion, the plurality of rubber elements for providing in the conduit a support-structure which is clampable between the inner wall and the at least one pipe or cable; and a sealant for application against the support-structure and for sealing off at least one end of the conduit between the inner wall and the at least one pipe or cable, the support-structure capable of supporting at least the sealant, wherein each rubber element is made of a rubber of a thermally substantially non-expandable type and wherein each rubber element is a longitudinal tubular element having a mantle wall, and with at least some of the rubber elements having a non-split mantle wall, and wherein the sealant is made of a polymer which is also of the thermally substantially non-expandable type, wherein the rubber or the polymer of the thermally substantially non-expandable type comprises rubber or polymer, respectively, which is free from components which would on heating cause the rubber or the polymer to expand to an extent larger than the extent to which the rubber or the polymer itself expands on such heating.

26. The system according to claim 25, wherein the rubber has a hardness in a range of 70 to 78 Shore A.

27. The system according to claim 25, wherein the plurality of rubber elements is cylindrical in shape having an outer diameter in a range of 16 mm to 30 mm.

28. The system according to claim 27, wherein the cylindrically shaped rubber element has an inner diameter in a range of 10 mm to 22 mm.

29. The system according to claim 25, wherein the sealant has a hardness in a range of 35-50 Shore A.

30. The system according to claim 25, wherein at least one of:
1) each of the plurality of rubber elements
and
2) the sealant is non-ignitable at a temperature of 400° C.

31. The system according to claim 25, wherein at least one of:
1) each of the plurality of rubber elements
and
2) the sealant has an oxygen index of at least 45%.

32. The system according to claim 25, further comprising for at least one of the at least one pipe or cable, an element of a thermally substantially expandable type being placeable coaxially around one of the at least one pipe or cable.

33. The system according to claim 32, wherein the element of the thermally substantially expandable type comprises material having a component which would on heating cause the material to expand to an extent larger than the extent to which the material itself expands on such heating.

34. The system according to claim 33, wherein the material is EVA or EPDM rubber.

35. The system according to claim 33, wherein the component is heat expandable graphite.

* * * * *